US012038724B2

(12) United States Patent
Winkler et al.

(10) Patent No.: US 12,038,724 B2
(45) Date of Patent: Jul. 16, 2024

(54) MECHANICAL TIMEPIECE WITH AN ANIMATED DISPLAY

(71) Applicant: ETA SA MANUFACTURE HORLOGERE SUISSE, Grenchen (CH)

(72) Inventors: Pascal Winkler, St-Blaise (CH); Jean-Luc Helfer, Le Landeron (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 1224 days.

(21) Appl. No.: 16/659,749

(22) Filed: Oct. 22, 2019

(65) Prior Publication Data

US 2020/0159170 A1 May 21, 2020

(30) Foreign Application Priority Data

Nov. 19, 2018 (EP) .................................... 18207099

(51) Int. Cl.

*G04B 45/00* (2006.01)
*G04B 15/06* (2006.01)
*G04B 15/14* (2006.01)

(52) U.S. Cl.

CPC ......... *G04B 45/0023* (2013.01); *G04B 15/06* (2013.01); *G04B 15/14* (2013.01)

(58) Field of Classification Search

CPC .... G04B 45/0023; G04B 15/06; G04B 15/14; G04B 45/0038; G04B 19/06; G04B 45/02
See application file for complete search history.

(56) References Cited

U.S. PATENT DOCUMENTS 2,891,378 A * 6/1959 Ducommun ....... G04B 45/0023 40/495
3,469,392 A * 9/1969 Tuetey ................ G04B 17/345 368/325

(Continued)

FOREIGN PATENT DOCUMENTS

CH 40 797 A 8/1908
CH 587 512 B5 9/1976

(Continued)

OTHER PUBLICATIONS

European Search Report for EP 18 20 7099 issued Apr. 26, 2019.
Communication dated Oct. 27, 2020, from the Japanese Patent Office in Application No. 2019-200499.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

Timepiece (1) comprising at least one mechanical movement (10) including at least a main plate (2), a resonator (11) and energy storage and distribution means (3) connected to an escape wheel set (4) by a going train (5), wherein at least one of the wheel sets, comprised in the going train (5) or an escapement mechanism (6) to which the escape wheel set (4) belongs, and which cooperates with the resonator (11), and which moves in a jerky or reciprocating motion during operation of the resonator (11), is a display wheel set (7) which includes at least two distinct pictures or patterns (8), which are arranged to move in succession before a fixed point of the main plate (2), during operation of the resonator (11), and to display thereon a sequence of animated images.

14 Claims, 5 Drawing Sheets

(56) References Cited

U.S. PATENT DOCUMENTS

| | | | | |
|---|---|---|---|---|
| 3,672,155 | A | 6/1972 | Bergey et al. | |
| 3,747,330 | A | 7/1973 | Tupone | |
| 2004/0062150 | A1 | 4/2004 | Neville | |
| 2012/0082012 | A1 | 4/2012 | Blanckaert et al. | |
| 2016/0161916 | A1* | 6/2016 | Francois | G04B 19/247 368/30 |
| 2016/0370766 | A1* | 12/2016 | Winkler | G04C 5/005 |

FOREIGN PATENT DOCUMENTS

| | | | | | |
|---|---|---|---|---|---|
| CH | 704684 | A2 | * | 9/2012 | G04B 39/00 |
| CN | 2063244 | U | | 10/1990 | |
| CN | 2282697 | Y | | 5/1998 | |
| CN | 1842754 | A | | 10/2006 | |
| CN | 101040227 | A | | 9/2007 | |
| CN | 202886851 | U | | 4/2013 | |
| CN | 103384856 | A | | 11/2013 | |
| CN | 103649850 | A | | 3/2014 | |
| CN | 106062644 | A | | 10/2016 | |
| CN | 107797438 | A | | 3/2018 | |
| CN | 107921317 | A | | 4/2018 | |
| EP | 1241543 | A1 | | 9/2002 | |
| EP | 1462877 | A2 | * | 9/2004 | G04B 19/25366 |
| EP | 1 510 890 | A1 | | 3/2005 | |
| EP | 1701227 | A1 | | 9/2006 | |
| EP | 2 527 930 | A1 | | 11/2012 | |
| EP | 2527930 | A1 | * | 11/2012 | G04B 13/002 |
| JP | 61239190 | A | * | 10/1968 | G04B 45/0007 |
| JP | 58176208 | U | | 11/1983 | |
| JP | 61239190 | A | * | 10/1986 | G04B 45/0007 |
| JP | 2013501210 | A | | 1/2013 | |
| JP | 2017504798 | A | | 2/2017 | |
| WO | WO-2013162423 | A2 | * | 10/2013 | G04B 47/044 |
| WO | WO-2016037938 | A1 | * | 3/2016 | G04B 15/00 |
| WO | WO-2016095779 | A1 | * | 6/2016 | G04B 19/10 |

* cited by examiner

MECHANICAL TIMEPIECE WITH AN ANIMATED DISPLAY

CROSS REFERENCE

This application is based on and claims priority under 35 USC 119(e) from European Patent Application No. 18207099.5 filed Nov. 19, 2018, the contents of which are incorporated herein by reference in their entirety.

FIELD OF THE INVENTION

The invention concerns a timepiece comprising at least one mechanical movement including at least a main plate, a resonator and energy storage and distribution means connected to an escape wheel set by a going train.

The invention concerns the field of animated displays in timepieces, in particular in watches.

BACKGROUND OF THE INVENTION

Since the beginnings of horology, designers have sought to use the regular working of a mechanical movement to add audio or visual animations to timepieces, clocks, table clocks and then watches, in the form of striking mechanisms, automaton movements, or particular displays.

This approach is still current, for timepieces that are intended to make their user or owner stand out.

The recurrent problem is how to offer the user of a mechanical watch an animation sequence, or a visual sequence of the film or cartoon type, or similar, without making the movement more complex, or adding mechanical or electronic components.

To produce a visual animation, it is necessary to generate a succession of still images representing the temporal change of a motion, in a given place. The time interval between two images must be less than approximately 150 ms for the observer to see a smooth animation. The set display time of each image must be as long as possible for contrast to be good. The transition time from one image to another must be as short as possible but is necessary to interrupt the effect of retinal persistence.

The entire history of the beginnings of cinema is linked to various devices based on the principle of animated images: the phenakistiscope, zoetrope, praxinoscope and others. More particularly, the device known as a thaumatrope includes at least two pictures on either side of a pivoting disc, such as a coin between two wires, wherein each of these two pictures contains only one part of the information, consequently, when the disc is stopped, the observer cannot see the whole image, whereas, when the disc is set in motion, for example by twisting and then pulling the two wires, a complete image resulting from superposition of the two pictures is then revealed to the observer; for example a caged bird results from the visual superposition of a first picture of an empty cage and a second picture of a free bird.

Animation mechanisms are also found in watches, but, although the starting point is a continuous rotational motion, a mechanism, such as a Maltese cross, is required, as in a cinema projector, to create the jerky movement necessary to obtain a film. Such a mechanism is a high energy consumer, especially at frequencies of more than 10 Hz, which are required to make a smooth film, which is pleasant for the user to look at.

WO Patent Nos. 2013162423A2 or 2013187798A1 in the name of CHAJKIN disclose optical mechanisms in accordance with such principles. If the images are visible to the naked eye, the mechanism implemented to display them requires an enormous amount of energy compared to the energy available for the basic movement of a mechanical watch. Thus, an additional energy source or action by the user on a pull-piece or similar, is required to make the animation work, for a duration limited by the level of energy provided and used. Furthermore, in these two documents, the animation requires a complex mechanism which must be added to the basic movement, which is expensive and uses space which is always sparse inside a timepiece.

SUMMARY OF THE INVENTION

The invention proposes to create a visual animation that operates continuously, as long as the timepiece (particularly a watch) is working, without requiring additional energy, and without impairing its chronometric performance.

The invention also endeavours, in the particular case of the watch, not to increase its thickness, and not to make it heavier, and to change as little as possible its mechanism: it is possible to implement the invention in any existing mechanical watch.

The principle of the invention consists in using the intermittent motion of the escape wheel of a mechanical movement, or of the intermediate wheel/escapement, or of another wheel set that moves a naturally jerky motion, such as, for example, a pallet lever, in order to offer the user a visual animation.

To this end, the invention concerns a timepiece according to claim 1.

BRIEF DESCRIPTION OF THE DRAWINGS

Other features and advantages of the invention will appear upon reading the following detailed description with reference to the annexed drawings, in which.

DETAILED DESCRIPTION OF PREFERRED EMBODIMENTS

Figure 1:
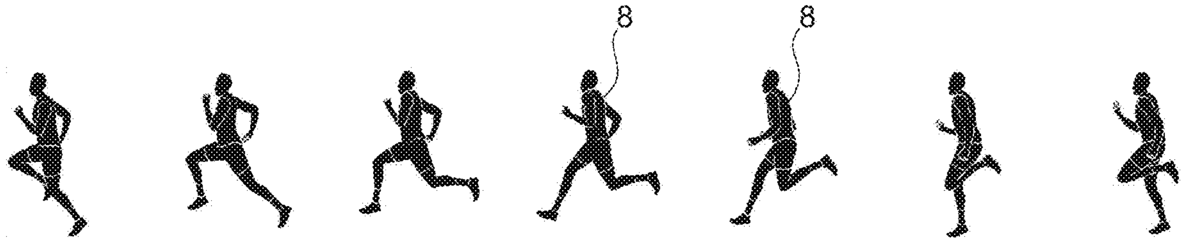
FIG. 1 represents a schematic view of a sequence of seven graphic pictures forming an animation of a man running.
Figure 2:
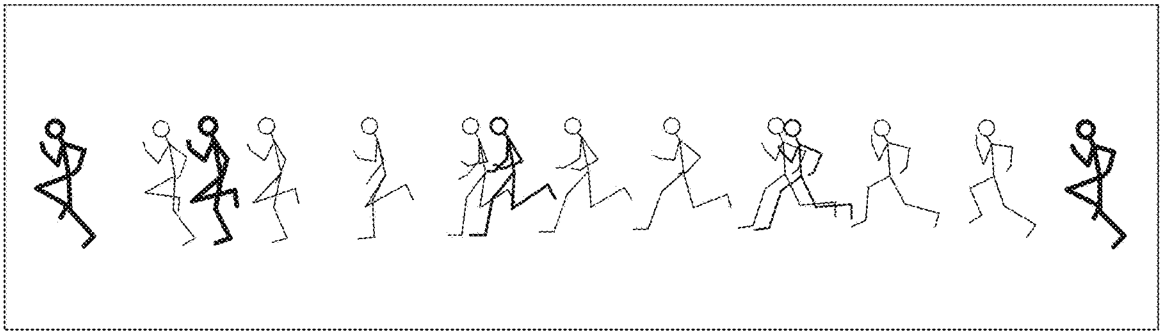
FIG. 2 represents, in a similar manner to FIG. 1, the breakdown of a runner's movement, where the silhouette is made up of articulated sticks.

The invention consists in using the intermittent motion of the escape wheel of a mechanical movement, or of the intermediate wheel/escapement, or of another wheel set that moves in a naturally jerky motion, such as, for example, a pallet lever, in order to offer the user a visual animation.

To this end, the wheel set concerned, which will be referred to hereafter as the "display wheel set", includes graphic representations, in the form of images, made for example by silk screen printing or similar processes, or very advantageously DRIE etching, particularly when this wheel set is made of micromachinable material such as silicon, oxidised silicon, DLC or suchlike. These graphic representations form the successive elements of an animation film. Naturally, it is possible to produce such an animation on several wheel sets, particularly several adjacent wheel sets like an escape wheel, a pallet lever, an inter-escapement wheel or an inertial wheel kinematically connected to the escape wheel, to offer the user an animation that is more complex or combines motions, such as for, example, a person moving in a complex motion and represented on an escape wheel, and showing, at regular intervals, an object in front of a tool with a reciprocating motion, hammer or axe, featured on the pallet lever. A display on two display wheel sets meshing with one another makes it possible to represent a pair of dancers, or skaters, or suchlike, whose motions may have different frequencies, which produces animations that change over time.

In the case where the escape wheel is chosen as the display wheel set, the animation is difficult to see with the naked eye due to the small diameter of the escape wheel, and is more visible with a magnifying glass or microscope, and this complication is thus part of the tradition of secret signatures of antique watches, such as those of Abraham-Louis Breguet.

Industrial implementation of the invention, by producing micrometric pictures or patterns, is henceforth possible to achieve for watches, because of the advent of micromanufacturing techniques, which can etch sufficiently small pictures on a timepiece wheel set.

Thus, the invention concerns a timepiece 1 comprising at least one mechanical movement 10. This movement 10 includes at least a main plate 2, a resonator 11 and energy storage and distribution means 3 connected to an escape wheel set 4 by a going train 5.

According to the invention, at least one of the wheel sets, comprised in going train 5 or an escapement mechanism 6 to which escape wheel set 4 belongs, and which cooperates with resonator 11, and which move in a jerky or reciprocating motion during operation of resonator 11, is a display wheel set 7. Such a display wheel set 7 includes at least two distinct pictures or patterns 8, which are arranged to move in succession before a fixed point of main plate 2, during operation of resonator 11, and to display thereon a sequence of animated images. It is understood that the invention can only be implemented by a wheel set with a jerky motion.

In an advantageous variant, display wheel set 7 is escape wheel set 4 which is the escape wheel, comprised in escapement mechanism 6, or an inter-escapement wheel, directly engaged with the escape wheel, and comprised in escapement mechanism 6.

In another variant, display wheel set 7 is a pallet lever 9 comprised in escapement mechanism 6.

In another variant, display wheel set 7 is a wheel of going train 5, comprising a plurality of N pictures 8, angularly distributed on this wheel, each of these pictures consisting of one image of a sequence of images forming an animation or film.

In yet another variant, display wheel set 7 is a freely mounted inertia wheel, which is directly meshed with the escape wheel, and comprised in escapement mechanism 6. Such an inertia wheel does not have a kinematic function, and meshes only with the escape wheel; its function is to limit the sensitivity of the oscillator to accelerations during wear, it preferably has the same inertia as the escape wheel but it can be both thinner and lighter than the latter, which makes it possible to have a larger display area for animation pictures 8, and over a larger diameter than that of the escape wheel, which shares the same jerky rhythm.

In the simplest embodiment, some of pictures 8 of a same display wheel set 7 are two-dimensional and extend in a substantially plane manner perpendicular to the pivot axis of display wheel set 7. More particularly, all the pictures 8 of a same display wheel set 7 are two-dimensional and extend in a substantially plane manner perpendicular to the pivot axis of display wheel set 7. More particularly still, all the pictures 8 of the same display wheel set 7 are coplanar.

In another embodiment, some of pictures 8 of a same display wheel set 7 are three-dimensional and extend at least partly in the direction of the pivot axis of display wheel set 7. For example, pictures etched to different depths, in bas-relief, simulate a three-dimensional display of the animation, especially if the effect of depth is artificially amplified by an optical system to improve viewing of the animations.

A traditional mechanical watch movement generally includes a Swiss lever escapement, the more unusual case of a detent escapement will be examined below. In a conventional example, for a Swiss lever escapement having an escape wheel with z=20 teeth and operating at a frequency of f=10 Hz, the escape wheel travels 2*z=40 steps per revolution and moves one step every dt=1/(2*f)=50 ms. The escape wheel remains stationary for approximately 45 ms and then moves for 5 ms. In this example, the animation with pictures 8, borne by escape wheel 4 as display wheel set 7, would be formed of 40 images and would last 2 seconds.

It should be noted that, if a number N of images different from 2*z is arranged over the periphery of display wheel set 7, particularly of escape wheel 4, then the animation moves forwards or backwards, depending on whether N is greater or smaller than the number of positions of display wheel set 7. Indeed, in a given place of observation, the N images will follow each other, every dt seconds, with a slight angular offset of dA=sign (mean angular speed of the display wheel set)*(360°/N−360°/(2*z)). The value of DA is thus an algebraic value, depending on whether the image appears to move forward or backwards with respect to the observer.

It is possible to envisage a viewing hole for viewing the animation at a precise location, or a skeleton movement, to see the animation N times in N different places. That is to say z is the number of teeth of the escape wheel and f the frequency of the resonator. Thus, the duration of the animation is T=z/f and the number of images in the sequence is N=2*z. After a time T, the animation is repeated.

An inter-escapement wheel preceding the escape wheel may also be convenient. For example, for a coaxial escapement with a wheel having 8 teeth, a resonator with a frequency of 4 Hz and a gear reduction between the inter-escapement wheel and the escape wheel of 2.5, the inter-escapement wheel makes one revolution in 5 seconds (duration of the film) and 40 steps.

Display wheel set 7 preferably comprises a plurality of pictures 8 which occupy angularly arranged positions, with respect to the pivot axis of display wheel set 7, with a constant angular pitch, where pictures 8 are disposed at an angle of 360°/N between each of the N pictures. More particularly, display wheel set 7 has one picture 8 in each angular position.

In a variant, display wheel set 7 is a toothed wheel set, and the number of angular positions is greater than or equal to two and is a multiple or integer sub-multiple of the number of teeth of display wheel set 7.

In another variant, display wheel set 7 is a toothed wheel set and the number of angular positions is greater than or equal to two and is different from a unit of a multiple or an integer sub-multiple of the number of teeth of display wheel set 7.

In yet another variant, display wheel set 7 is a toothed wheel set, and the number of angular positions is greater than or equal to two and is coprime with the number of teeth of display wheel set 7.

Figure 3:
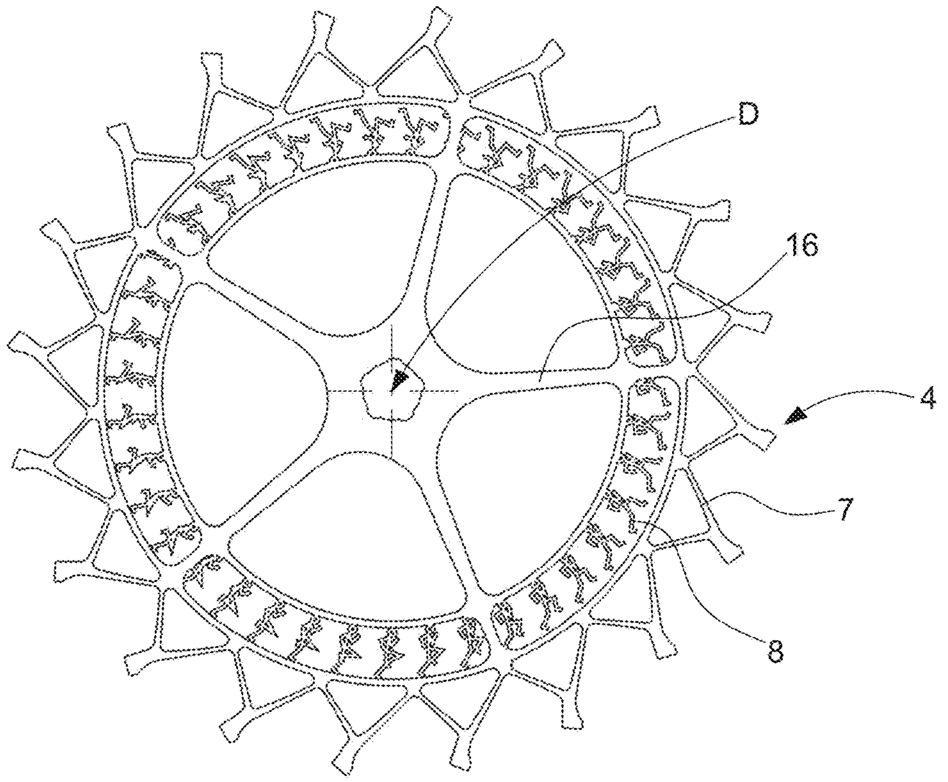
FIG. 3 represents a schematic view of an escape wheel provided with 20 teeth and 39 pictures representing a runner, with two rings connecting the pictures to the arms of the wheel.
Figure 4:
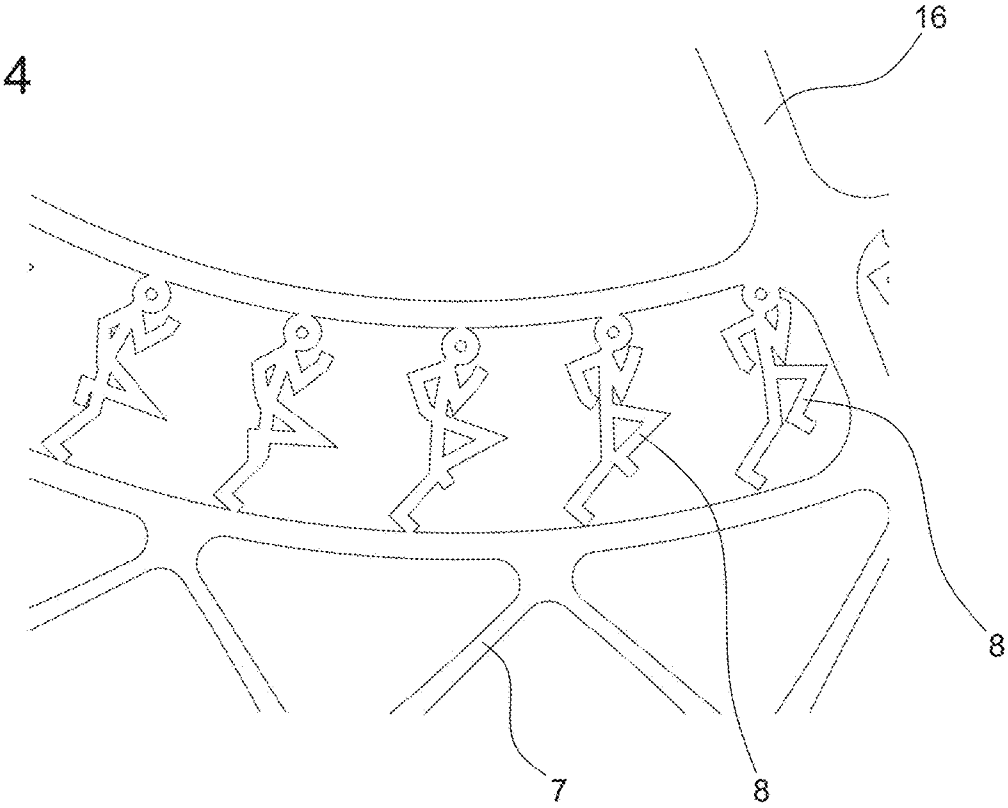
FIG. 4 is a detail of FIG. 3.
Figure 5:
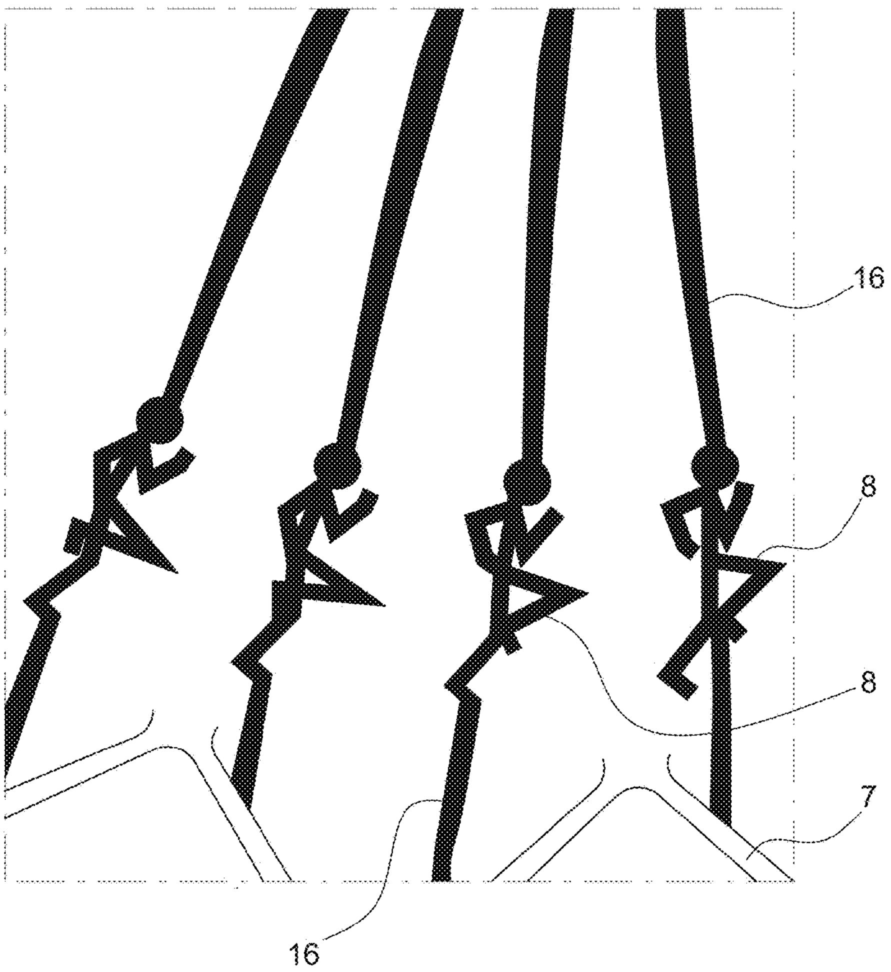
FIG. 5 is a detail of another wheel, particularly an escape wheel, which includes as many radial arms as pictures, and which connect the latter to the wheel hub.

More particularly still, as in the example of FIGS. 3 and 4, the pictures 8 of display wheel set 7 are in the same radial position with respect to the pivot axis of display wheel set 7.

Figure 7:
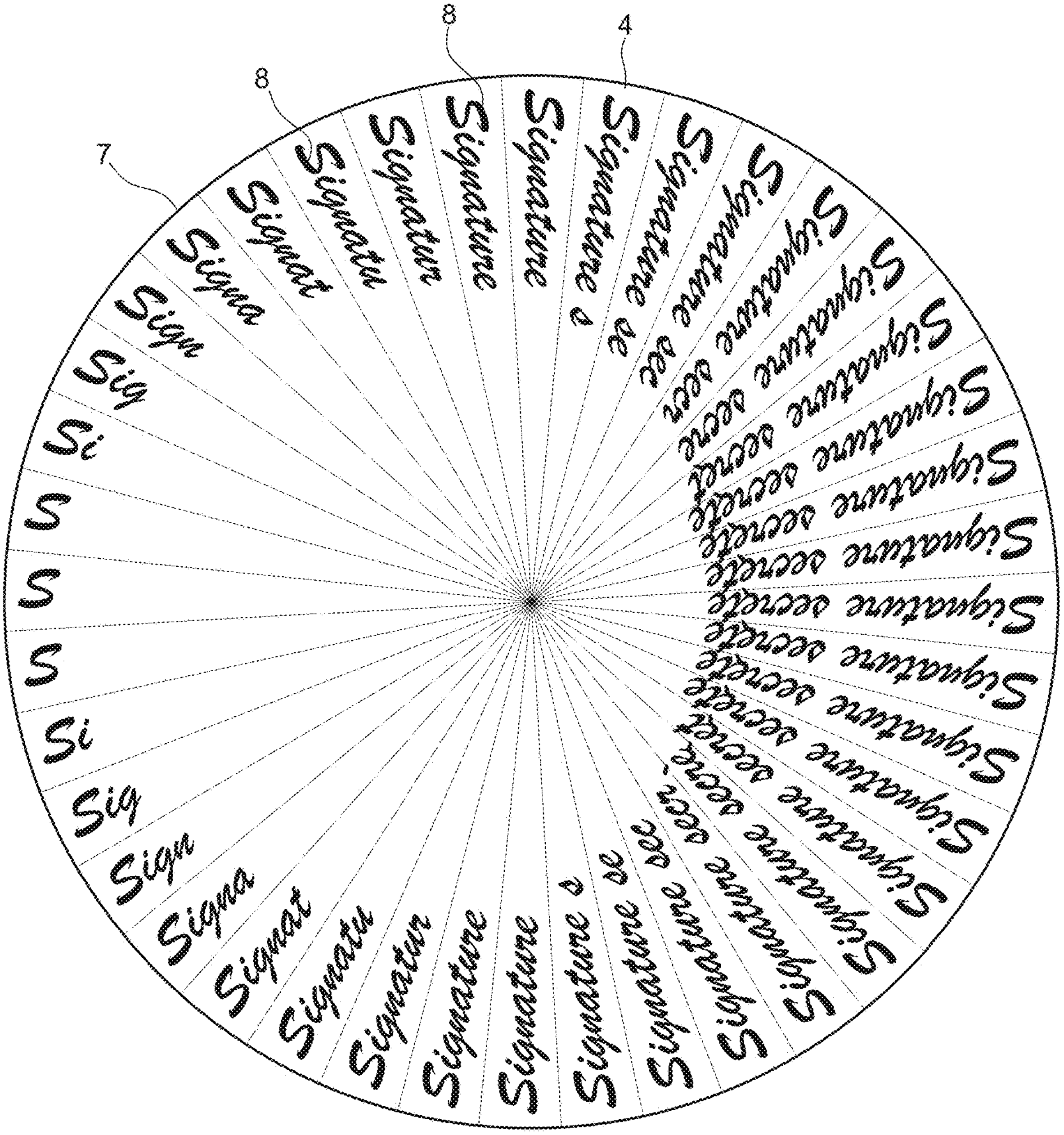
FIG. 7 represents a schematic view of a part of another wheel, which has spokes, or sectors, each carrying one part of a secret signature, in order to make the French expression "signature secrete" to appear and then gradually disappear.

More particularly, as in the example of FIG. 7 specific to a secret signature, display wheel set 7 has images 8 of different radial extension compared to the pivot axis of display wheel set 7.

In a variant wherein display wheel set 7 is escape wheel 4, and wherein the escapement is a Swiss lever escapement, i.e. the wheel moves in half-tooth steps, the number N of pictures 8 is advantageously comprised between $(2*z-4)$ and $(2*z+4)$, z being the number of teeth of the wheel. More particularly, the number N of pictures 8 is comprised between $(2*z-1)$ and $(2*z+1)$.

In a variant wherein display wheel set 7 is escape wheel 4, and wherein the escapement is a detent escapement, i.e. the wheel moves in steps of a whole tooth, the number N of pictures 8 is advantageously comprised between $(z-4)$ and $(z+4)$, z being the number of teeth of the wheel. More particularly, the number N of pictures 8 is comprised between $(z-1)$ and $(z+1)$.

Advantageously, timepiece 1 comprises optical means 13 for shifting and/or magnifying a picture 8, and/or means 14 for projecting a natural or artificial light beam onto picture 8, and/or means 15 for reflecting picture 8.

Optical means 13 for shifting and/or magnifying picture 8 may comprise at least one magnifying glass. More particularly, this magnifying glass is on the crystal, possibly a transparent case back, and/or on the dial of timepiece 1.

Means 14 for projecting an artificial or natural light beam onto picture 8 more particularly comprise an optical projection of the animation illuminated by sunlight, a laser source or another artificial light source.

Means 15 for reflecting picture 8 more particularly comprise an optical reflection of the animation illuminated by sunlight, a laser source or another artificial light source.

More particularly, pictures 8 are diffractive pictures which form an image on a surface remote from timepiece 1, for example by laser beam diffraction.

A particularly advantageous optical variant consists in the use of POF or plastic optical fibre, which concerns the bundling of optical fibres into a bundle or strip. This technology allows images to be enlarged, with tapered fibres, whose diameter is small compared to the image to be enlarged, here the relevant area of the display wheel set, and whose diameter is largest at the bundle output, close to the observer. The advantage of these optical fibre bundles is first their compactness, conventionally with a core diameter of 120 micrometres to 1 millimetre, and also a reduced protective sheath diameter, for example 230 micrometres for a core of 120 micrometres, and also the very small radius of curvature allowed, for example 4 millimetres for a core with a diameter of 175 micrometres. This makes it easy to shift the image to any available place in a watch, either in a dial, in a case middle (on the front or on an edge), or otherwise. Thus, optical means 13 for shifting and/or magnifying picture 8 may comprise at least one such optical fibre bundle.

The only limitations on the choice of pictures 8 concern their small dimensions and the requirement for legibility. The animation may thus concern, in a traditional manner in horology, the representation of at least one animal, or part of an animal, in motion, or human beings engaged in sports activities, running, dancing, skating or in other activities in the tradition of eighteenth century libertine watches. Any subject matter can be treated, in particular world famous characters from cartoons or stories or otherwise.

FIG. 7 illustrates another attractive example implementation of the invention for a secret signature that is revealed letter by letter and/or disappears just as gradually. The combined use of holograms makes it possible to produce anti-counterfeit markings; the specific display of certain patterns or sequences of patterns under a specific strobe light makes such an identification mark difficult to identify and reproduce.

Figure 8:
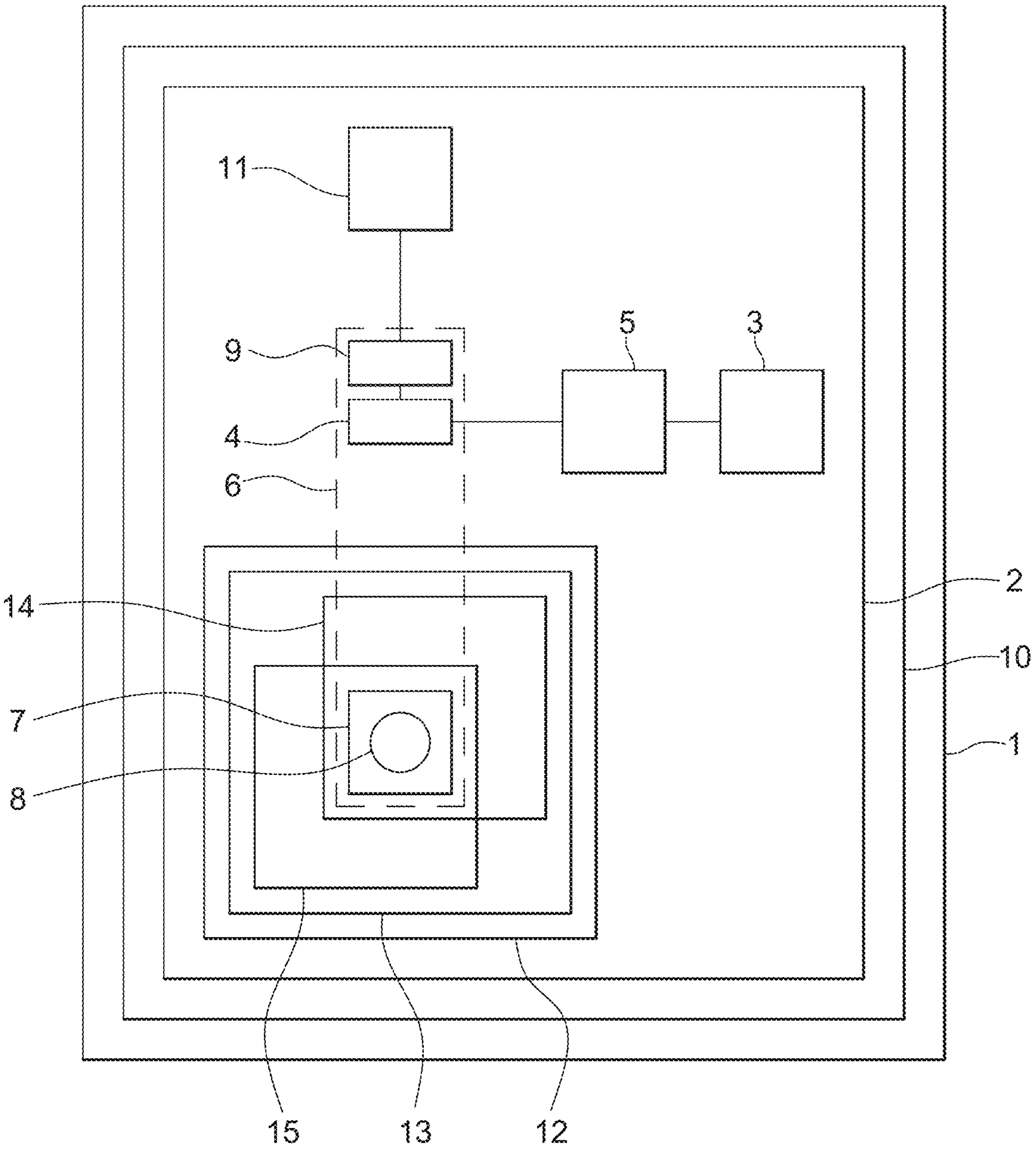
FIG. 8 is a block diagram representing a timepiece, particularly a watch, including a mechanical movement, comprising a resonator associated with an escapement mechanism of which at least one wheel set is an animation support wheel set according to the invention, this watch including an aperture for viewing the picture, optical means for magnifying the picture, and means for projecting a natural or artificial light beam onto the picture, and means for reflecting the picture.

FIG. 8 illustrates such a timepiece 1, particularly a watch, comprising a mechanical movement 10 including at least a main plate 2, a resonator 11 and energy storage and distribution means 3 connected to an escape wheel set 4 by a going train 5. The resonator is associated with an escapement mechanism 6, of which at least one wheel set is an animation support display wheel set 7 according to the invention. This timepiece 1, particularly this watch, more particularly but not exclusively includes an aperture 12 for viewing the picture and, in the case of FIG. 8, optical means 13 for shifting and/or magnifying the picture, and means 14 for projecting a natural or artificial light beam onto the picture, and means 15 for reflecting the picture.

The invention is well suited to a wide resonator frequency range, typically between f=3 Hz and f=30 Hz.

The invention is well suited to the use of a cut plate as display wheel set 7. In other words, the functional parts (teeth, hub, arms and rim) and pictures 8 are in the same plate.

More particularly, display wheel set 7 is produced by a LIGA process.

More particularly, display wheel set 7 is produced by a DRIE process.

More particularly, pictures 8 are etched on the surface of display wheel set 7.

More particularly, the pictures are printed and/or silk screen printed on the surface of display wheel set 7.

More particularly, display wheel set 7 comprises at least one ring which connects all the pictures to the arms of the wheel, as seen in FIG. 3.

More particularly, display wheel set 7 has N radial arms 16 which connect the N pictures 8 to the hub of display wheel set 7.

Figure 6:
FIG. 6 represents, in a similar manner to FIG. 1, the breakdown of the motion of a skater, wherein the animation is the silhouette of a motion out of the plane of the wheel, giving the illusion of a three-dimensional motion.

More particularly, as in FIG. 6, the animation is the silhouette of a motion out of the plane of display wheel set 7, giving the illusion of a three-dimensional motion.

The invention is also suited to a more complex optical animation, through the use of several adjacent display wheel sets 7 each of which carries different pictures or patterns which combine together to display complementary motions, with some of the wheel sets rotating in a continuous jerky manner, and others making a reciprocating jerky motion.

In short, by using the operation of the escapement mechanism, without impairing its efficiency, the invention makes it possible to enjoy a free visual animation, without making the timepiece movement any more complex. In particular, it is sufficient to decorate or modify the escape wheel or any wheel set having a sufficient angular period, such as a pallet lever or inter-escapement wheel, or an inertia fly wheel meshed with the escape wheel, or any similar wheel set.

The invention claimed is:

1. A timepiece comprising at least one mechanical movement including at least a main plate, a resonator and energy storage and distribution means connected to an escape wheel set by a going train, characterized in that at least one of the wheel sets comprised in said going train or in an escapement mechanism to which said escape wheel set belongs and which cooperates with said resonator, and which moves in a jerky or reciprocating motion during operation of said resonator, is a display wheel set which includes at least two distinct pictures or patterns, which are arranged to move in succession before a fixed point of said main plate, during operation of said resonator, and to display thereon a sequence of animated images, wherein the timepiece is characterized in that one said display wheel set is a pallet lever comprised in said escapement mechanism.

2. The timepiece according to claim 1, characterized in that some of said pictures or patterns are two-dimensional and extend in a substantially plane manner perpendicular to the pivot axis of said display wheel set.

3. The timepiece according to claim 1, characterized in that some of said pictures or patterns are three-dimensional and extend at least partly in the direction of the pivot axis of said display wheel set.

4. The timepiece according to claim 1, characterized in that said display wheel set includes a plurality of said pictures or patterns which occupy angularly distributed positions, with respect to the pivot axis of said display wheel set, with a constant angular pitch.

5. The timepiece according to claim 4, characterized in that said display wheel set has one said picture or pattern in each said angular position.

6. The timepiece according to claim 4, characterized in that said display wheel set is a toothed wheel set, and in that the number of said angular positions is greater than or equal to two, and is a multiple or integer sub-multiple of the number of teeth of said display wheel set.

7. The timepiece according to claim 1, characterized in that said pictures or patterns of said display wheel set are in the same radial position with respect to the pivot axis of said display wheel set.

8. The timepiece according to claim 1, characterized in that said display wheel set has pictures or patterns of different radial extension with respect to the pivot axis of said display wheel set.

9. The timepiece according to claim 1, characterized in that one said display wheel set is said escape wheel set, which is an escape wheel, or an inter-escapement wheel comprised in said escapement mechanism.

10. The timepiece according to claim 1, characterized in that said timepiece includes an aperture for viewing the picture or pattern, and/or optical means for shifting and/or magnifying the picture or pattern, and/or means for projecting a natural or artificial light beam onto the picture or pattern, and means for reflecting the picture or pattern.

11. The timepiece according to claim 10, characterized in that said timepiece includes said optical means for shifting and/or magnifying the picture or pattern, which includes at least one fibre optical bundle for shifting and/or magnifying the image.

12. The timepiece according to claim 1, wherein the resonator comprises a frequency range of 3 Hz to 30 Hz.

13. A timepiece comprising at least one mechanical movement including at least a main plate, a resonator and energy storage and distribution means connected to an escape wheel set by a going train, characterized in that at least one of the wheel sets comprised in said going train or in an escapement mechanism to which said escape wheel set belongs and which cooperates with said resonator, and which moves in a jerky or reciprocating motion during operation of said resonator, is a display wheel set which includes at least two distinct pictures or patterns, which are arranged to move in succession before a fixed point of said main plate, during operation of said resonator, and to display thereon a sequence of animated images, wherein the timepiece is characterized in that said display wheel set includes a plurality of said pictures or patterns which occupy angularly distributed positions, with respect to the pivot axis of said display wheel set, with a constant angular pitch, and wherein the timepiece is characterized in that said display wheel set is a toothed wheel set and in that the number of said angular positions is greater than or equal to two, and is different from a unit of a multiple or of an integer sub-multiple of the number of teeth of said display wheel set.

14. A timepiece comprising at least one mechanical movement including at least a main plate, a resonator and energy storage and distribution means connected to an escape wheel set by a going train, characterized in that at least one of the wheel sets comprised in said going train or in an escapement mechanism to which said escape wheel set belongs and which cooperates with said resonator, and which moves in a jerky or reciprocating motion during operation of said resonator, is a display wheel set which includes at least two distinct pictures or patterns, which are arranged to move in succession before a fixed point of said main plate, during operation of said resonator, and to display thereon a sequence of animated images, wherein the timepiece is characterized in that said display wheel set includes a plurality of said pictures or patterns which occupy angularly distributed positions, with respect to the pivot axis of said display wheel set, with a constant angular pitch, and wherein the timepiece is characterized in that said display wheel set is a toothed wheel set, and in that the number of said angular positions is greater than or equal to two, and is coprime with the number of teeth of said display wheel set.

* * * * *